United States Patent
Gray

(10) Patent No.: US 6,668,984 B2
(45) Date of Patent: Dec. 30, 2003

(54) OXIDATION PROTECTION FOR CARBON/ CARBON COMPOSITE AND GRAPHITE FRICTION MATERIALS

(75) Inventor: Paul E. Gray, North East, MD (US)

(73) Assignee: Honeywell Advanced Composites Inc., Morristown, NJ (US)

(*) Notice: Subject to any disclaimer, the term of this patent is extended or adjusted under 35 U.S.C. 154(b) by 35 days.

(21) Appl. No.: 09/945,041

(22) Filed: Aug. 31, 2001

(65) Prior Publication Data

US 2002/0096407 A1 Jul. 25, 2002

Related U.S. Application Data

(60) Provisional application No. 60/251,737, filed on Dec. 6, 2000.

(51) Int. Cl.[7] ............................................... F16D 55/02
(52) U.S. Cl. ..................... 188/251 R; 428/408; 427/343
(58) Field of Search ..................... 188/251 R; 428/212, 428/220, 368, 408, 457, 646, 689, 698, 704; 427/249.1, 249.6, 249.15, 343, 379, 380

(56) References Cited

U.S. PATENT DOCUMENTS

| | | |
|---|---|---|
| 2,989,153 A | 6/1961 | Boulet |
| 3,650,357 A | 3/1972 | Nelson et al. |
| 3,767,386 A | 10/1973 | Ueda et al. |
| 3,871,934 A | 3/1975 | Marin |
| 3,972,395 A | 8/1976 | Jannasch et al. |
| 4,617,165 A | 10/1986 | Tsang et al. |
| 4,663,060 A | 5/1987 | Holinski |
| 4,760,900 A | 8/1988 | Shima et al. |
| 4,837,073 A | 6/1989 | McAllister et al. |
| 4,863,001 A | 9/1989 | Edmisten |
| 5,330,036 A | 7/1994 | Nishi et al. |
| 5,401,440 A | 3/1995 | Stover et al. |
| 5,439,080 A | 8/1995 | Haneda et al. |
| 5,622,751 A | 4/1997 | Thebault et al. |
| 5,725,077 A | 3/1998 | Taylor et al. |
| 5,725,955 A | 3/1998 | Tawil et al. |
| 5,759,622 A | 6/1998 | Stover |
| 5,971,113 A | 10/1999 | Kesavan et al. |

FOREIGN PATENT DOCUMENTS

| | | |
|---|---|---|
| DE | 280226 A3 | 7/1990 |
| JP | 1150030 A | 6/1989 |
| SU | 1219561 | 3/1986 |
| WO | WO 9116554 A1 | 10/1991 |

Primary Examiner—Pam Rodriguez
(74) Attorney, Agent, or Firm—Larry J. Palguta

(57) ABSTRACT

The invention provides for oxidatively resistant surface coated carbon/carbon composites and other graphite-like material, a method for the preparation of these materials, and their use in high temperature applications, preferably in brake for airplanes. The surface coated carbon/carbon composite or graphite-like material, which is resistant to oxidation at high temperatures comprises a fiber-reinforced carbon/carbon composite or graphite having a First Coating (A) of silicon and/or silicon carbide, and a Second Coating (B) comprising a material containing phosphorus chemically bound to oxygen which is chemically bound to silicon.

20 Claims, 6 Drawing Sheets

Comparative Example 1
One 0.5 hr cycle at 2100°F
1.7% Weight Loss

Inventive Example 5
Three 0.5 hr cycles at 2100°F
~0% Weight Loss

OXIDATION PROTECTION FOR CARBON/CARBON COMPOSITE AND GRAPHITE FRICTION MATERIALS

This application claims the benefit of U.S. Provisional Application No. 60/251,737 filed Dec. 6, 2000 and entitled OXIDATION PROTECTION OF CARBON—CARBON COMPOSITE FRICTION MATERIALS.

FIELD OF THE INVENTION

The invention provides for oxidatively resistant carbon/carbon (C/C) composites and other graphite-like material, a novel coating combination for effecting increased oxidation resistance of the carbon/carbon composites and other graphite-like material, a method for the preparation of these materials, and their use in high temperature applications, preferably in brakes on aircraft.

BACKGROUND OF THE INVENTION

When the carbon/carbon composites are utilized as a stack of discs on aircraft brakes, they are required to absorb large amounts of kinetic energy in order to stop the aircraft during landing or in the event of a rejected take-off. During some of the stops, the carbon is heated to sufficiently high temperatures that surfaces exposed to air will oxidize. Some conventional carbon composites have the necessary thermal and mechanical properties required for specific brake designs; however, these conventional composites have open porosities (typically 5% to 10%) which permit internal oxidation. The internal oxidation weakens the material in and around the brake rotor lugs or stator slots, which are areas that transmit the torque during braking.

Damage associated with oxidation has led to premature removal of carbon brake discs on a variety of aircraft, from all current brake manufacturers. Thus, the overall objectives of the invention are to protect carbon/carbon composites or graphites from oxidation at elevated temperatures. Both field data and theoretical models indicate that modern carbon/carbon aircraft brakes used in the transportation industry frequently see peak temperatures above 1500° F. and that some models (including brakes for use in military aircraft or freight hauling) routinely experience extended periods between 1450° F. to 2200° F. over their service lives.

In order to inhibit the oxidation of carbon/carbon composite articles, phosphoric acid based penetrants have been used extensively. These penetrants are disclosed in McAllister et al., U.S. Pat. No. 4,837,073 and Stover et al., U.S. Pat. No. 5,759,622.

McAllister et al. teach an aqueous penetrant composition containing water, phosphoric acid, $MnHPO_4$ $1.6H_2O$, $AlH_2PO_4$, 50% $B_2O_3$, and $Zn_3PO_4$. McAllister et al also teach that a barrier coating of silicon carbide can be formed on the C/C composite prior to applying the penetrant composition.

A disadvantage of the coated composite of McAllister et al. is that the overall coating thickness is relatively high. When the thickness is too high, there is an undesirable increase in mass and the loss of the overall brake dimensional tolerance. The combination of the barrier coating and the penetrant have a thickness of 125–250 microns (5–10 mm). Thick coatings such as these are susceptible to spallation on low expansions typical of C/C composites.

Stover et al. teach an aqueous penetrant composition which comprises (a) phosphoric acid, (b)(i) a metal phosphate or (ii) a combination of a zinc salt and an aluminum salt, and (c) a compatible wetting agent selected from the group consisting of polyols, alkoxylated monohydric alcohols, silicone surfactant and mixtures thereof. Stover et al. also teach that a barrier coating can be formed on the C/C composite prior to applying the penetrant composition. These barrier coatings include silicon carbide, titanium carbide, boron carbide and silicon oxycarbide.

A disadvantage to both the penetrant type systems of Stover et al. and McAllister et al. results from the fact that an inert atmosphere must be used when heat curing the penetrant in the composite. During this heat curing step, the phosphoric acid diffuses throughout the internal porosity of the composite. The diffused phosphoric acid is partially reduced to elemental phosphorus and lower phosphoric oxides wherever the phosphoric acid comes in contact with carbon. During use of these composites, the phosphorus vaporizes, is forced to the surface and burns on contact with the air. Also, the phosphoric acid and other coating ingredients can be transported to the wearing surface where they can degrade the brake's friction and wear properties.

Through the use of a novel dual coating system, which includes a coat prepared from a glass frit slurry, the composite of the present invention has a significantly improved oxidative resistance at the high end of the typical operating temperature range over the coatings known in the art.

SUMMARY OF THE INVENTION

Although, carbon/carbon composites and other carbon materials, such as graphite, rank among the most inert and least reactive materials known at high temperatures, oxidation is a highly significant cause of deterioration of strength and loss of material. Thus, retardation of the oxidation reactions could be highly beneficial in lowering consumption, both by direct oxidation and by lessening breakage caused by oxidation-induced loss of strength.

Accordingly, the present invention, in part, provides a dual coating for effecting an oxidation inhibiting barrier to graphite and similar carbonaceous bodies.

The present invention also provides, in part, a glass frit slurry that can be applied to carbon/carbon composites and graphite-like materials to achieve an oxidation prevention coating.

The present invention also provides, in part, a method for producing the glass frit slurry to be applied to carbon/carbon composites and graphite-like materials to produce an oxidation prevention coating.

The present invention also provides, in part, a method for applying the glass frit slurry to the carbon/carbon composites and graphite-like materials to produce an oxidation prevention coating.

The oxidatively resistant surface coated carbon/carbon composites and graphite-like material according to the present invention are preferably used in brakes on aircraft, but may also be used in other high temperature applications, such as electrodes for arc melting of steel, mold stock for metal casting, rocket nozzles, furnace linings, and Hall cell anodes.

In particular, the present invention also provides, in part, a novel surface coated carbon/carbon composite or graphite-like material, which is resistant to oxidation at high temperatures comprising: (A) a first coating of silicon and/or silicon carbide, and (B) a second coating comprising a material containing phosphorus chemically bound to oxygen and said oxygen is chemically bound to silicon.

Advantages of the present invention will become more apparent from the detailed description given hereinafter.

However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Figure 1:
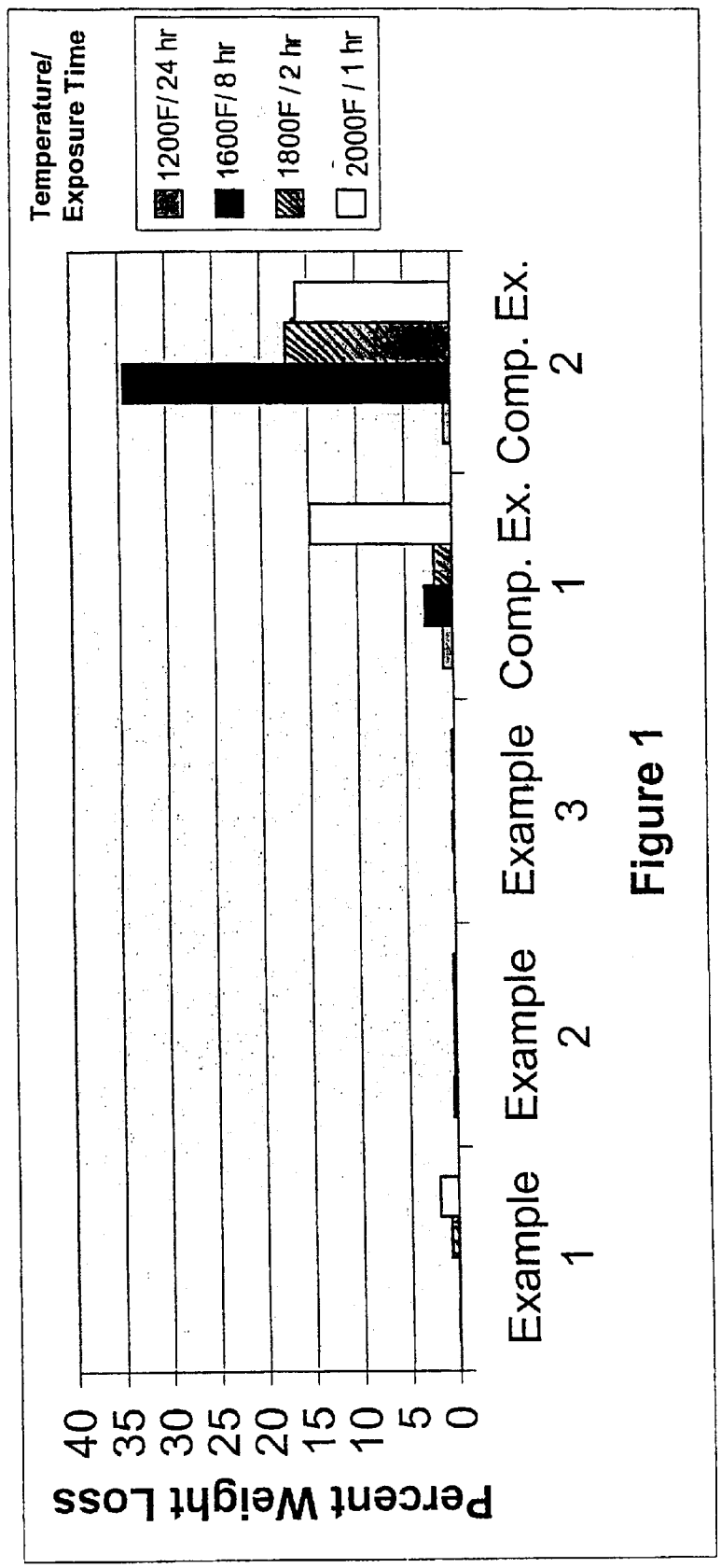
FIG. 1 is a graph showing the oxidative stability of Inventive Examples 1–3 and Comparative Examples 1–2.

The present invention includes a surface coated carbon/carbon composite or graphite-like material, which is resistant to oxidation at high temperatures comprising: (A) a First Coating of silicon and/or silicon carbide; and (B) a Second Coating comprising a material containing phosphorus chemically bound to oxygen and said oxygen is chemically bound to silicon.

Herein the phrase "carbon—carbon composite" refers to a composite material utilizing carbon fibers embedded in a carbon matrix. "Graphite-like materials" include graphites and modifications thereof.

The present invention, in part, includes a glass frit slurry. The glass frit slurry is used to form the second coating (B) and is prepared from a slurry mixture comprising phosphoric acid and a glass frit. The glass frit slurry may also contain oxides and/or salts of zinc, alkali metal, an alkaline metal, aluminum, boron, a transition metal, Ge, Sb, Sn, Si, Pb, Bi or mixtures thereof. Any salt may be used so long as the salt does not undesirably lower the oxidative resistance of the C/C composite.

The glass frits are prepared by grinding glass, which may be porous. It is preferred that the glass frit has a fusion temperature of at least 1700° F. and a flow temperature of at least 2000° F., since brake discs comprising the inventive surface coated carbon/carbon composite or graphite-like material are exposed to temperatures ranging from 1500° F. to 2200° F. during the normal course of use. If the glass frit has a fusion temperature of less than 1700° F., the glass will begin to flow at these high temperatures resulting in a thin coating having reduced oxidative protection. It is preferred to use a glass frit having a fusion temperature of about 1700° F. to about 2100° F. and a flow temperature of about 2000° F. to about 2700° F. Mixtures of glass frits are also envisioned.

The following table contains fusion temperatures of several types of frits that are currently commercially available from the Ferro Corporation, Cleveland, Ohio.

| Manufacturer's Frit Designation | Composition Type | Fusion Temp. (° F.) | Suitability for use in Airplane Brake Discs |
|---|---|---|---|
| 3249 | Magnesium aluminum borosilicate | 1900 | High |
| 3292 | Sodium calcium alumino-borosilicate | 1650 | Low |
| 3824 | sodium calcium zinc borosilicate | 1400 | Low |
| EG0002 | Barium alumino silicate | 1832 | High |

The phosphoric acid is combined in the slurry mixture in the concentrated form and is added in an amount of 10 wt % to 50 wt % based on the total mass of the slurry mixture. The concentrated phosphoric acid is at least 50 wt % in water, preferably at least 85 wt % in water.

In another embodiment, the slurry mixture contains essentially no added water. This ensures that the highest concentration of active coating material is placed on the coupon surface during coating. In addition, the lack of water ensures a minimum drying shrinkage and minimum subsequent cracking. One could add water, but more frit coatings would be necessary. The phrase "essentially no added water" means that reagent grade materials are used with up to 10 wt % added water, preferably up to 0.1 wt % added water.

This invention also includes, in part, a process for preparing a surface coated carbon/carbon composite or graphite-like material, which is resistant to oxidation at high temperatures comprising: coating a carbon/carbon composite or graphite-like material with silicon and/or silicon carbide to form a First Coating (A), and coating an outer surface of First Coating (A) with a slurry mixture comprising phosphoric acid and a glass frit to form a Second Coating (B). Preferably, the phosphoric acid is added to the slurry mixture in the concentrated form and is added in an amount of 10–50 wt % based on the total mass of the slurry mixture. In one embodiment, the slurry mixture contains essentially no added water.

In one embodiment, the slurry mixture also contains a zinc salt and/or zinc oxide. The salts of zinc include any species that does not undesirably reduce the overall oxidative stability of the coated composite. These salts include, chlorides, bromides, acetates, sulfates, sulfites, nitrates, nitrites, phosphates, etc. The slurry mixture may further contain a salt and/or an oxide of an alkali metal, an alkaline metal, aluminum, boron, a transition metal, Ge, Sb, Sn, Si, Pb, or Bi.

It is preferred that the First Coating (A) is formed by melt infiltration or vapor deposition (either chemical vapor deposition or physical vapor deposition) of silicon. A typical method for melt infiltration is as follows: 1) a carbon black layer is brushed or sprayed on a C/C coupon and then air dried; 2) an 8% silicon spray mix is applied to a thickness of 0.1–0.2 g/in$^2$ and air dried; and 3) the silicon coated coupon is heated in a vacuum furnace at 2600° F. A more detailed description of preparing such a coating is described in Forsythe et al, U.S. application Ser. No. 09/708,891, filed Nov. 8, 2000, which is herein incorporated by reference in its entirety.

In the inventive process, the slurry mixture is heated to a temperature necessary for the phosphoric acid to react with the glass frit to form a cementitious bond between the silicon of the First Coating (A) and the glass frit particles and a cementitious bond between the frits. It is preferred to heat the slurry mixture to at least 450° F. More preferred is to heat the slurry mixture to 550° F. to 800° F.

The surface coated oxidatively resistant carbon/carbon composites and graphite-like material according to the present invention are preferably used in brake discs on aircraft, but may also be used in other high temperature applications, such as electrodes for arc melting of steel, mold stock for metal casting, rocket nozzles, furnace linings, and Hall cell anodes.

When used as, e.g., a brake disc, the overall brake dimensional tolerance should be maintained and thin coatings are preferred. The thickness of both the First Coating (A) and the Second Coating (B) is in the range of 50–125 microns. Preferably, the thickness is 15–75 microns, and most preferred the thickness is 20–50 microns.

Carbon/Carbon Substrate

Carbon-carbon composites are generally prepared from carbon preforms. Carbon preforms are made of carbon fibers, which may be formed from pre-oxidized acrylonitrile resin. In one embodiment, these fibers can be layered together to form a shape, such as a friction brake. The shape is heated and infiltrated with methane or another pyrolyzable carbon source to form the carbon—carbon composites. In one embodiment, the carbon—carbon composite has a density from about 1.6 to about 1.9 g/cm$^3$. A particularly useful carbon—carbon composite has a density of about 1.75 g/cm$^3$. Carbon-carbon composites and methods of their manufacture are known to those in the art. A comprehensive reference in this area is *Carbon-Carbon Materials and Composites*, John D. Buckley and Dan D. Edie, Noyes Publications, 1993, which is herein incorporated by reference in its entirety.

Even though the invention may be applied to various carbon/carbon materials, testing and evaluation, as described below, was done on CARBENIX® 4000 brand of carbon/carbon composite material marketed by Honeywell International, Inc., an aircraft brake carbon/carbon composite friction material, consisting of non-woven PAN precursor carbon fibers, densified with carbon utilizing CVD, and CARBENIX® 2400 brand of carbon/carbon composite material marketed by Honeywell International, Inc., an aircraft brake carbon/carbon composite friction material, consisting of pitch precursor carbon fibers, densified with carbonized phenolic resin and with carbon from CVD.

EXAMPLES

Example 1

First Coating (A)

10 cm×1 cm CARBENIX® 2400 brand of carbon/carbon composite material (C/C) coupons were sprayed with a mixture of 30 percent 20 micron silicon powder (Alfa), 2 percent ammonium alginate binder and 68 percent distilled water. The coupons were sprayed uniformly to achieve a coating areal weight of 150–300 grams/square meter. The silicon powder coated coupons were thoroughly dried at 100° C. The coupons were then placed on a boron nitride coated graphite tray and loaded into a graphite element vacuum furnace. The furnace was heated to 1450° C. and held at this temperature for 1 hour.

After cooling, the coupons were removed and any excess silicon powder adhering to the surface was washed off with distilled water.

Second Coating (B)

A frit slurry was prepared from a mixture of 100 parts Ferro frit #3249, 8.8 parts anhydrous zinc chloride (Alfa), 18.2 parts Ludox colloidal silica (DuPont) and 73.0 parts 85% orthophosphoric acid (Alfa), the weight is based upon 200 parts of total slurry. These ingredients were milled in polyethylene jars with alumina balls for 30 minutes to ensure thorough mixing. The frit slurry was brushed onto the silicon-coated C/C coupon surface with a paint brush to achieve a weight gain of 0.08 g/cm$^2$. The frit coated coupons were dried in air by ramping the oven temperature to 600° F. over 4 hours. The coupons were then coated with a second application of the frit slurry layer followed by drying in air by ramping the oven temperature to 600° F. over 4 hours. The weight gain of the second frit slurry layer application was also 0.08 g/cm$^2$.

The coated coupons were weighed and then oxidation tested isothermally under one of the following conditions:

Test 1–24 hours at 1200° F.

Test 2–8 hours at 1600° F.

Test 3–2 hours at 1800° F.

Test 4–1 hour at 2000° F.

The coupons were cooled and weighed after each test and the loss in mass of the coupons resulting from oxidation was used to calculate the percent weight loss. The percent weight loss of the coated coupons are shown in FIGS. 1 and 2

Example 2

The C/C coupons were coated with the First Coating (A) as described in Example 1, The Second Coating (B) was applied as described in Example 1, except that the frit slurry coating was modified by substituting 100 parts of Ferro frit #EG0002 for the Ferro frit #3249.

Figure 2:
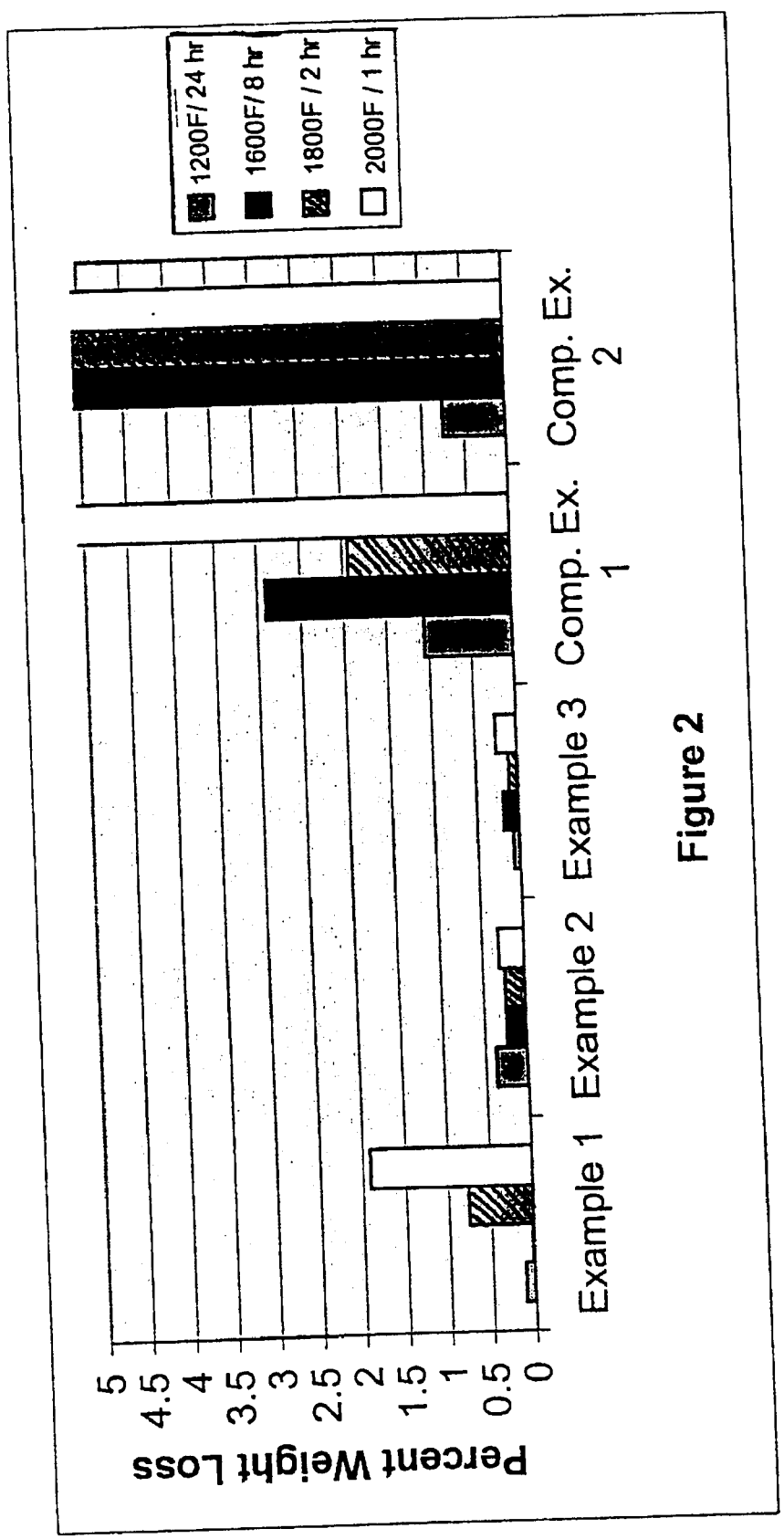
FIG. 2 is a graph showing the same data as FIG. 1, except that the scale has been magnified to highlight the low weight loss of Inventive Examples 1–3.

The coated coupons were oxidation tested as in Example 1 and the percent weight loss of the coated coupons are shown in FIGS. 1 and 2.

Example 3

The C/C coupons were coated with the First Coating (A) as described in Example 1. The Second Coating (B) was applied as described in Example 1, except that the frit slurry coating was modified by substituting a mixture of 50 parts Ferro frit #3249 and 50 parts #EG0002 for the Ferro frit #3249

The coated coupons were oxidation tested as in Example 1, and the percent weight loss of the coated coupons are shown in FIGS. 1 and 2. The coated coupons were also oxidation tested isothermally at the following conditions:

5 minutes exposure at 1149° C. (2100° F.) in air;

remove from furnace, cool and weigh;

return coupons to the furnace;

4 hours exposure at 871° C. (1600° F.) in air; and remove from furnace, cool and weigh.

Figure 3:
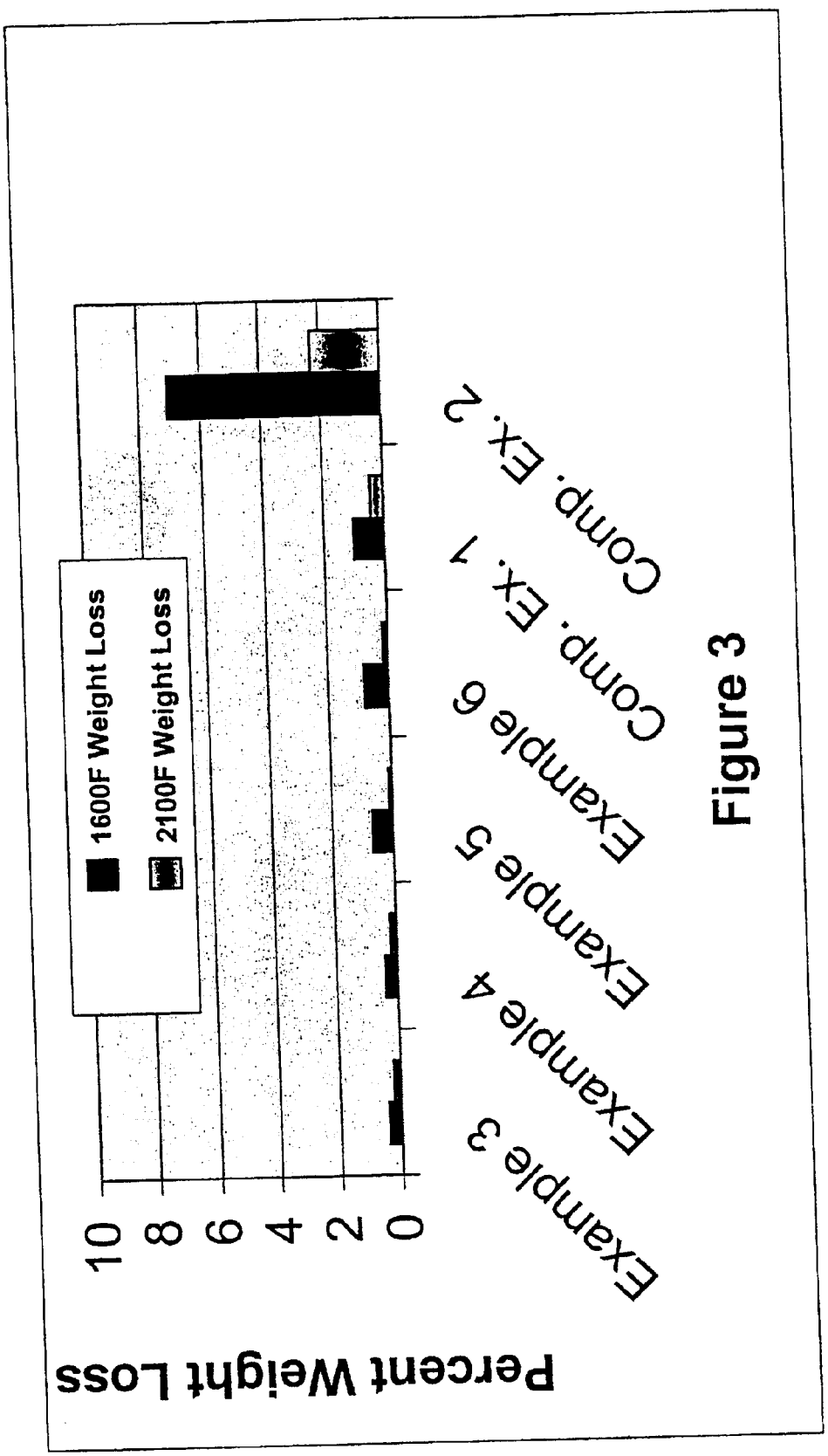
FIG. 3 is a graph showing the oxidative stability of Inventive Examples 3–6 and Comparative Examples 1–2.
Figure 4:
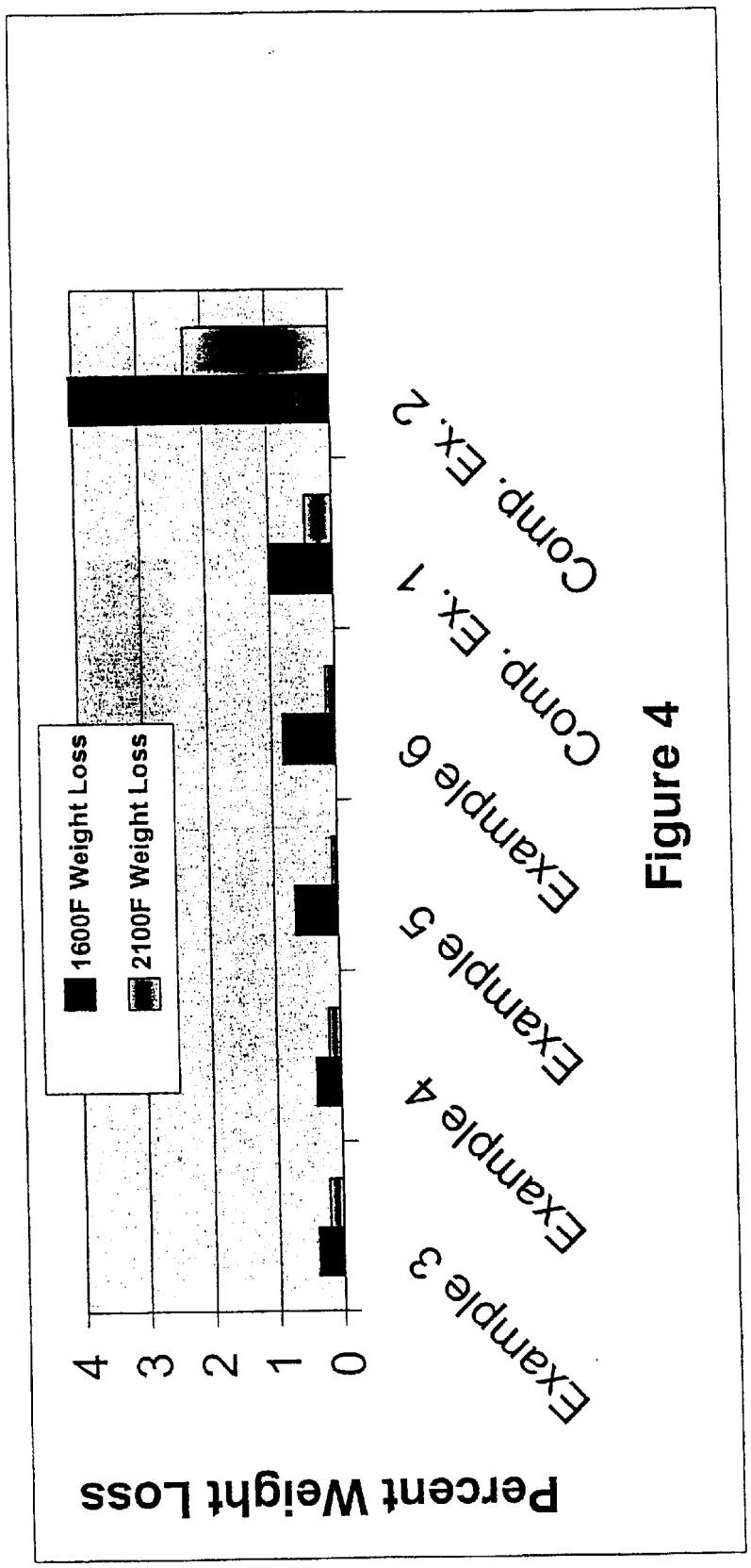
FIG. 4 is a graph showing the same data as FIG. 3, except that the scale has been magnified to highlight the low weight loss of Inventive Examples 3–6.

The percent weight loss of the coated coupons are shown in FIG. 3. The weight loss reported at 1600° F. also includes the weight loss resulting from exposure at 2100° F.

Example 4

The C/C coupons were coated as described in Example 3, except that only one coating of the frit slurry was applied to form the Second Coating (B).

The coated coupons were oxidation tested isothermally at the following conditions:

5 minutes exposure at 1149° C. (2100° F.) in air;

remove from furnace, cool and weigh;

return coupons to the furnace;

4 hours exposure at 871° C. (1600° F.) in air; and remove from furnace, cool and weigh.

The percent weight loss of the coated coupons are shown in FIG. 3.

Example 5

The C/C Coupons were coated with the sprayed silicon mixture as described in Example 1. The Second Coating (B) was applied as described in Example 1, except that the frit coating slurry was prepared from a mixture of 50 parts Ferro frit #3249, 50 parts Ferro frit #EG0002, 22.6 parts Ludox colloidal silica (DuPont) and 77.4 parts 85% orthophosphoric acid (Alfa).

The coated coupons were oxidation tested as in Example 4, and the percent weight loss of the coated coupons are shown in FIG. 3.

Example 6

The C/C Coupons were coated with the sprayed silicon mixture as described in Example 1 to form the First Coating (A). The Second Coating (B) was applied as described in Example 1, except that the frit slurry coating mixture was prepared from a mixture of 50 parts Ferro frit #3249, 50 parts Ferro frit #EG0002, and 100.0 parts 85% orthophosphoric acid (Alfa).

The coated coupons were oxidation tested as in Example 4, and the percent weight loss of the coated coupons are shown in FIG. 3.

Example 7

This Example shows that the inventive frit slurry coating can be applied to a C/C coupon which has a first layer of silicon formed by physical vapor deposition (PVD).

The C/C coupons were silicon coated by PVD. This process was performed by first applying a thin coating of carbon black to the surface of the coupons and air drying them. The coupons were then placed on a graphite rack above cups of metallic silicon in a graphite box with a lid. The box containing the samples was heated to 3000° F. for 6 hours to vaporize the silicon and allow it to react with the surface of the coupons. After cooling, the coupons were removed from the graphite box and coated with the combination of Ferro frit #3249 and #EG0002 as described in Example 3 to form the Second Coating (B). Two slurry layers were applied.

Comparative Example 1

The C/C coupons were coated with the sprayed silicon mixture as described in Example 1 to form the First Coating (A). The coupons were coated with a composition, designated PK-13, which is similar to a composition described by Stover et al. PK-13 is a penetrant solution containing 17.6 wt % $H_2O$, 49.5 wt % $H_3PO_4$(85%), 2.9 wt % $MnHPO_4$ 1.6$H_2O$, 13.6 wt % $Al(H_2PO_4)_3$ (50%), 0.9 wt % $B_2O_3$, 12 wt % $K(H_2PO_4)$ and 3.5 wt % $Zn_3(PO_4)_2$. The PK-13 composition was painted onto the coated coupons. The coupons were dried in air at about 212° F., cooled and then further heated in a nitrogen-purged retort furnace to 1200° F. To ensure complete coating, the coupons were recoated with the PK-13, dried and heated in nitrogen to 1200° F.

The oxidative stability of the PK-13 coated coupons were compared to the dual-layer (silicon melt plus frit slurry) coating of the present invention. These PK-13 coated coupons were oxidation tested as in Example 1, and the percent weight losses of the coated coupons are shown in FIGS. 1 and 2. The PK-13 coated coupons were also oxidation tested as in Example 4. There were observed small wisps of flame coming from the surface upon heating to 2100° F. The percent weight loss of the PK-13 coated coupons are shown in FIG. 3.

Comparative Example 2

The C/C coupons were coated in a similar manner as described in Example 1, except that the First Coating (A) was not formed and the PK-13 solution was painted directly onto the bare carbon/carbon coupon.

The coated coupons were oxidation tested as in Example 1, and the percent weight loss of the coated coupons are shown in FIGS. 1 and 2. The coated coupons were also oxidation tested as in Example 4. There were observed small wisps of flame coming from the surface upon heating to 2100° F. The percent weight loss of the coated coupons are shown in FIG. 3.

Observations

Figure 6:
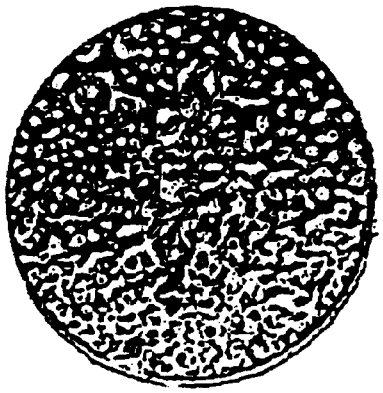
FIG. 6 is a photograph of coupons exposed to high temperature oxidative conditions that were prepared by the process described in Inventive Example 3 and comparative Example 2.
Figure 6:
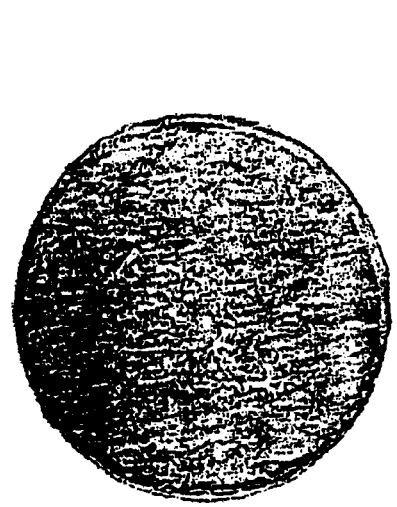

The data in FIGS. 1–4 show that c/c composites coated with the combination of the melt infiltration (MI) coating (First Coating (A)) plus the glassy overcoating (Second Coating (B)) (Inventive Example 3) results in an unexpectedly high resistance to oxidation when compared to the C/C composites coated with the MI coating plus the PK-13 coating which is similar to the coatings described in Stover et al. This is particularly evident from FIG. 6, which is a photograph of coupons prepared by the process of Inventive Example 3 and Comparative Example 2 (Stover et al.). The coupon prepared by Inventive Example 3 showed essentially no weight loss after being exposed to 2100° F. for 30 minutes for three cycles. On the other hand, the coupon prepared by Comparative Example 2 (Stover et al.) had a 1.7% weight loss and showed significant dewetting of the surface upon melting. It is also clear from the data in FIGS. 1–4, that the oxidation of the coupon coated with only PK-13, i.e., Comparative Example 2, is particularly severe at between 1200° F. and 1800° F.

In addition, the samples of Comparative Examples 1–2, which were coated with PK-13, showed small wisps of flame coming from the surface when the samples were removed form the furnace after 2100° F. exposure. This is due to the high amounts of phosphoric acid introduced into samples during coating. In contrast, the inventive frit systems contain much less phosphoric acid and the frit particles help to keep the phosphoric acid on the surface. As the inventive frit mixture is heated, the phosphoric acid attacks the silicate frit particles forming both a cementitious bond between the frit particles and the Si/SiC surface coating (First Coating (A)) and a cementitious bond between the frit particles. The reaction of the frit particles with the phosphoric acid prevents it from being absorbed by the underlying carbon substrate. In addition, the lower frit curing temperature in air prevents the phosphoric acid from being reduced to elemental P. Thus, the phosphate-based systems similar to those taught by Stover et al. are ineffective about 1800°–2000° F.

Figure 5:
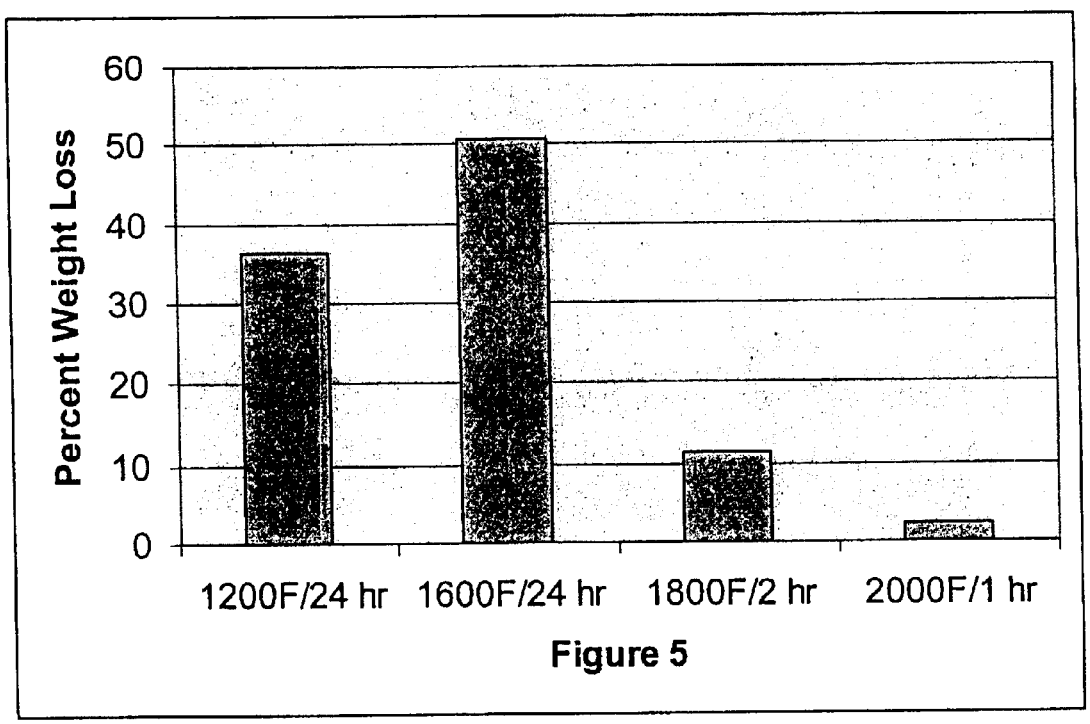
FIG. 5 is a graph showing the oxidative stability of a silicon melt infiltrated (MI) C/C coupon sample without a second coating.

FIG. 5 shows that coupons containing only First Coating (A) are highly unstable to oxidation.

In conclusion, the inventive combination of the First Coating (A) plus the frit coating (Second Coating (B))results in the lowest oxidation weight loss of any of the tested coating combinations. It is envisioned that other higher melting frit compositions could be employed to compensate for possible higher exposure temperatures.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

Each numerical range recited in this specification is considered to encompass all whole numbers within the endpoints and ranges therebetween.

We claim:

1. A surface coated carbon/carbon composite or graphite-like material, which is resistant to oxidation at high temperatures comprising:
   (A) a first coating of silicon and/or silicon carbide, and
   (B) a second coating comprising a material containing phosphorus chemically bound to oxygen and said oxygen is chemically bound to silicon, wherein the second coating (B) is prepared from a slurry mixture comprising phosphoric acid and a glass frit, and
   wherein the glass frit has a fusion temperature of at least 1700° F. and a flow temperature of at least 2000° F.

2. The surface coated carbon/carbon composite or graphite-like material according to claim 1, wherein the second coating (B) also contains zinc.

3. The surface coated carbon/carbon composite or graphite-like material according to claim 1, wherein the glass frit has a fusion temperature of about 1700° F. to about 2100° F. and a flow temperature of about 2000° F. to about 2700° F.

4. The surface coated carbon/carbon composite or graphite-like material according to claim 1, wherein the phosphoric acid is combined in the slurry mixture in the concentrated form and is added in an amount of 10–50 wt % based on the total mass of the slurry mixture.

5. The surface coated carbon/carbon composite or graphite-like material according to claim 1, wherein the slurry mixture contains essentially no added water.

6. The surface coated carbon/carbon composite or graphite-like material according to claim 5, wherein the slurry mixture contains up to 0.1 wt % added water.

7. The surface coated carbon/carbon composite or graphite-like material according to claim 1, wherein the slurry mixture further comprises a salt and/or an oxide of an alkali metal, an alkaline metal, aluminum, boron, a transition metal, Ge, Sb, Sn, Si, Pb, Bi or mixtures thereof.

8. The surface coated carbon/carbon composite or graphite-like material according to claim 1, wherein the slurry mixture comprises more than one type of glass frit.

9. A brake disc comprising the surface coated carbon/carbon composite or graphite-like material defined in claim 1.

10. A process for preparing a surface coated carbon/carbon composite or graphite-like material, which is resistant to oxidation at high temperatures comprising:
    coating a carbon/carbon composite or graphite-like material with silicon and/or silicon carbide to form a first coating (A), and
    coating an outer surface of the first coating (A) with a slurry mixture comprising phosphoric acid and a glass frit to form a second coating (B), and wherein the glass frit has a fusion temperature of at least 1700° F. and a flow temperature of at least 2000° F.

11. The process according to claim 10, wherein the slurry mixture also contains a zinc salt and/or zinc oxide.

12. The process according to claim 10, wherein the glass frit has a fusion temperature of 1700° F. to 2100° F. and a flow temperature of 2000° F. to 2700° F.

13. The process according to claim 10, wherein the phosphoric acid is added to the slurry mixture in the concentrated form and is added in an amount of 10–50 wt % based on the total mass of the slurry mixture.

14. The process according to claim 10, wherein the slurry mixture contains essentially no added water.

15. The process according to claim 10, wherein the slurry mixture further comprises a salt and/or an oxide of an alkali metal, an alkaline metal, aluminum, boron, a transition metal, Ge, Sb, Sn, Si, Pb, or Bi.

16. The process according to claim 10, wherein the first coating (A) is formed by melt infiltration or vapor deposition of silica.

17. The process according to claim 10, wherein the slurry mixture is heated to a temperature necessary for the phosphoric acid to react with the glass frit to form a cementitious bond.

18. The process according to claim 17, wherein the slurry mixture is heated to at least 450° F. to form a cementitious bond between the frits.

19. A glass frit slurry comprising a glass frit and concentrated phosphoric acid, wherein the glass frit has a fusion temperature of at least 1700° F. and a flow temperature of at least 2000° F.

20. A surface coated carbon/carbon composite or graphite-like material, which is resistant to oxidation at high temperatures comprising:
    (A) a first coating of silicon and/or silicon carbide, and
    (B) a second coating comprising a material containing glass frit particles and phosphorus chemically bound to oxygen and said oxygen is chemically bound to silicon;
    wherein there is a cementitious bond between the first coating (A) and the glass frit particles of the second coating (B).

* * * * *